June 21, 1932.  H. RABEZZANA  1,863,875
INTERNAL COMBUSTION ENGINE
Filed Aug. 31, 1929   3 Sheets-Sheet 1

Inventor
HECTOR RABEZZANA
By Francis D. Hardesty
Attorney

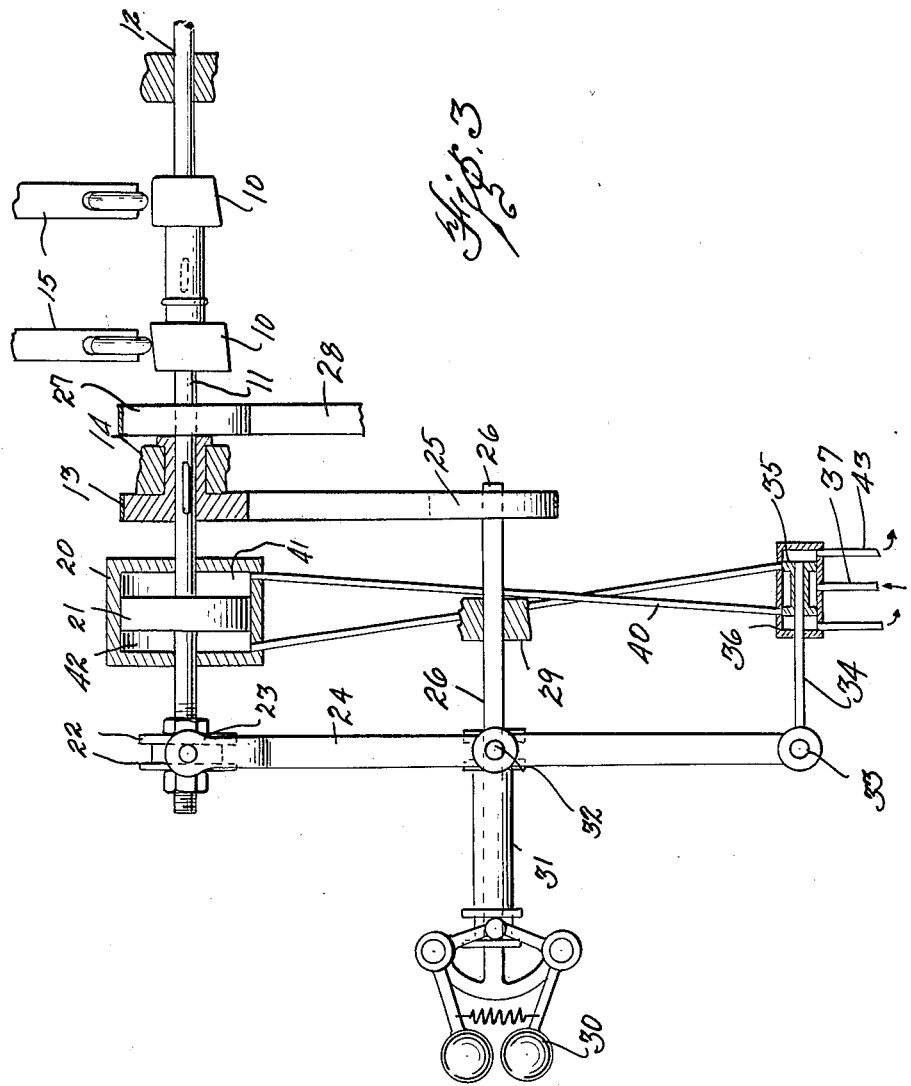

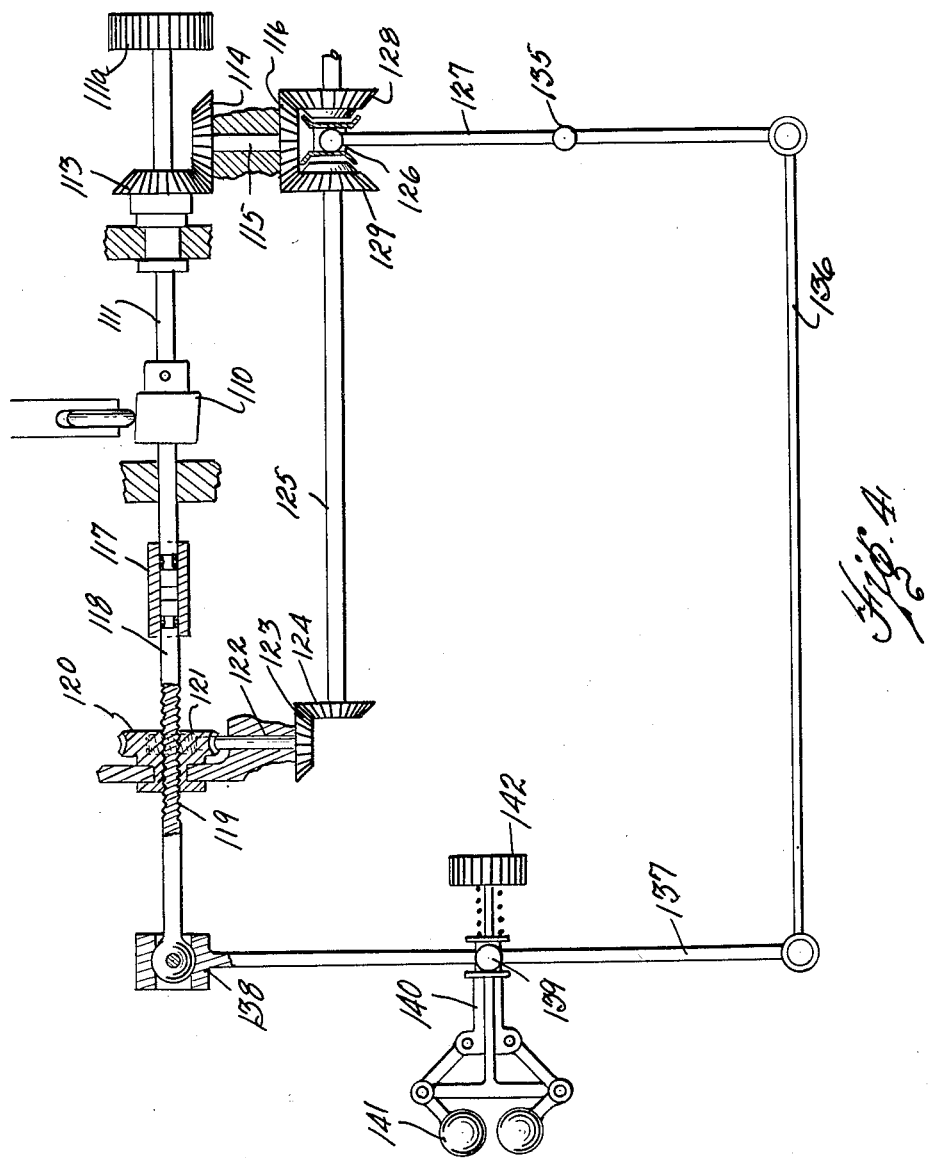

Patented June 21, 1932

1,863,875

UNITED STATES PATENT OFFICE

HECTOR RABEZZANA, OF FLINT, MICHIGAN

INTERNAL COMBUSTION ENGINE

Application filed August 31, 1929. Serial No. 389,631.

The present invention relates to internal combustion engines and more particularly to valve operating means and has, among its objects, the increasing of engine efficiency by more properly timing the valves.

Another object is means for varying the timing of the valves in accordance with engine speed.

Another object of the invention is means for regulating the timing of the valves in accordance with engine speeds and maintaining such timing constant so long as the engine speed remains constant.

Still other objects will readily occur to those skilled in the art upon reference to the following description and the accompanying drawings, in which Figure 1 is a diagram showing the curves indicating motor efficiency under several sets of conditions.

Figure 3 is a more or less diagrammatic view showing the preferred form of cam timing mechanism in accordance with the present invention.

Figure 4 is a similar view showing a modified form of cam timing mechanism.

As is well known to engineers designing and building internal combustion engines, the timing of the valves is quite important and is related very closely to the speed at which the engine is run. It is well known that for each engine speed, there is an optimum setting of the valve operating cam. For example, if the valves are to be operated so as to give the best efficiency at high speed, such as for a racing automobile, the cam setting and valve operation for best results is a particular one which differs materially from the cam setting and valve operation for an engine which is designed to operate at considerably lower speeds. Consequently, in the ordinary automobile engine intended for a general purpose vehicle, the cam setting and valve timing is always a compromise and therefore operates usually at a lower efficiency than is possible to obtain.

Figure 1:
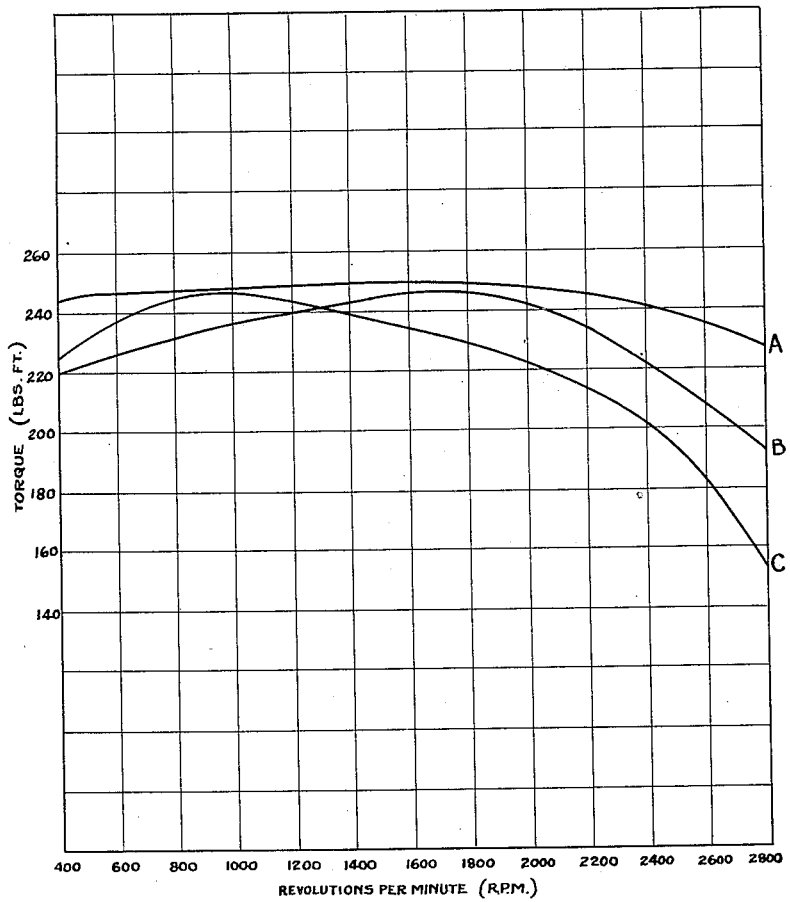

In Fig. 1, several torque curves are shown indicating the efficiency of an engine with different valve settings. The curve C indicates a valve setting in which the greatest efficiency is at about 1000 R. P. M. and shows a large decrease as the speed goes up, dropping nearly fifty percent at 2800 R. P. M. The curve B shows a valve setting for greatest efficiency at 1800 R. P. M. This curve shows low efficiency both above and below the selected point. The curve A shows the comparatively straight efficiency curve possible in timing the valves to suit the speed.

The present invention contemplates forming the cam so as to provide for valve operation at maximum efficiency at high speed and likewise to provide for maximum efficiency at low speeds. This is accomplished by making the cam of greater length axially than is customary and varying its contour from one end to the other and providing means whereby the surface utilized in operating the valve will be changed at one end or the other or at some intermediate portion, according to the speed of the engine.

Figure 2:
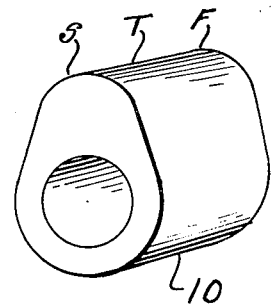
Figure 2 is a perspective view of a valve operating cam made in accordance with the present invention.

Such a cam is indicated in Figure 2 and may be divided into several parts, each of which will be shaped to suit best intermediate speeds between maximum and minimum and may be either in steps or with a tangent sloping to the different curves allowing, by axially moving the cam, the setting of the proper cam shape under the follower while the engine is running. In Figure 2, for example, with a clockwise movement of the cam, the end F will be in advance of the end S and the valve will open sooner. In addition to this fact, the surface T between the two ends may be varied in contour as well as radial position.

One method of operating the cams so as to move them axially to the proper position for a given engine speed is shown in Figure 3. In this figure, a pair of cams is shown at 10 as carried on a rotating shaft 11. This shaft, of course, is carried in suitable bearings, one of which is indicated at 12, and passes through a pulley or sprocket 13 having a bearing in the wall 14. This pulley will be splined upon the shaft so that the latter may have a longitudinal movement therein.

Each of the cams cooperates with a follower 15 to actuate a corresponding valve.

Toward one end of the shaft, the latter passes through a chamber or cylinder 20 within which is a piston 21 and beyond the chamber is provided with a pair of flanges 22 between which operate the pins of the yoke member 23 carried by lever 24.

The pulley or sprocket 13 drives by means of a belt or chain a second pulley or sprocket 25 secured to the governor shaft 26. Sprocket 27 and chain 28 are positively driven by the crankshaft. The governor shaft is mounted in a suitable stationary portion of the engine, such as the wall 29, in a suitable bearing therein and drives the governor 30. This may be an ordinary fly-ball governor mounted on the end of shaft 26 and is adapted to move the sleeve 31 through the centrifugal actions of the balls and thereby move a fulcrum 32 for lever 24. When the lever 24 is in the position shown in the drawing, the lower end 33 thereof, by means of the rod 34, maintains a valve member 35 in neutral position in chamber 36 to which oil, under pressure, is constantly supplied through pipe 37 emptying into its central portion. As long as the lever 24 is in its substantially vertical position, as indicated in the drawing, the valve 35 will remain in its neutral position as shown.

However, when the governor 30 reaches sufficient speed of rotation to move the fulcrum 32 toward the left, for example, it will immediately move the lower end 33 of the lever to the left also and thereby the valve member 35 also to the left. This permits oil entering the central portion of chamber 36 to pass up the pipe 40 into the right hand side 41 of chamber 20, thereby unbalancing the pressure on the sides of piston 21, increasing the pressure in the chamber 41 and causing the flow of oil from chamber 42 on the other side of the piston down into the right hand end of chamber 36 and out of pipe 43. Of course, as the speed of the governor slows down, the fulcrum 32 moves in the other direction and carries with it the valve member 35 and the reverse action takes place. This movement of piston 21 causes a corresponding axial movement of the cams 10 and a corresponding change in timing of the valves with which the followers 15 are associated.

The pipe 37 may receive its oil supply from the lubricating system of the motor or be supplied by an auxiliary pump.

The arrangement just described provides means for moving and holding in fixed relation, the cams 10 so that as long as the speed of the engine remains constant, the cams will remain in the position to which they have been adjusted for that speed, and they will be pivotally held in this position by the pressure balance established on the sides of piston 21.

A mechanical construction for carrying out the same operation is shown in Figure 4. In this figure only one cam 110 is shown but it will be understood that all of the cams for a given engine may be operated in the same fashion and all may be simultaneously adjusted as has been described and as will be described in connection with this figure.

In Figure 4, the cam shaft is indicated at 111 and is driven by gear 111a from any suitable means, not shown. This shaft 111 is likewise slidable in a bevel gear 113 coacting with the second bevel 114 carried on a short vertical shaft 115 having at its other end a third bevel gear 116.

The other end of shaft 111 extends into and is freely rotatable in a suitable sleeve 117 but is so arranged as not to be movable axially therein. Into the other end of the sleeve is extended a second shaft 118 and prevented from axial movement therein in any suitable manner. This shaft 118 is provided with a threaded portion 119 coacting with a nut 120 constituting a worm gear co-operating with a suitable worm 121 carried on a shaft 122.

The lower end of shaft 122 carries a bevel gear 123 co-operating with another bevel gear 124 carried on shaft 125. This latter shaft 125 will be carried in suitable bearings and has splined thereon a double clutch member 126 movable by means of a lever 127 so as to coact with either of two corresponding clutch members carried by the two bevel gears 128 and 129 freely rotatable on shaft 125 and in constant mesh with bevel gear 116. Lever 127 is pivotally mounted at 135 and operable by means of a link 136 from a lever 137 which corresponds to lever 24 in the previously described mechanism and has at its upper end a pivotal connection 138 with the threaded shaft 118.

Lever 137 has at an intermediate point a pivotal connection 139 with the sliding sleeve 140 of the governor 141 driven in any suitable manner as by a gear or sprocket 142 from any suitable source connected with the engine.

In this form of the device when the engine begins to operate and the governor 141 picks up sufficient speed to separate the balls thereof, the sleeve 140 is immediately moved toward the left carrying with it the fulcrum point 139 and moving the link 136 and the lever 127 so as to engage the clutch 126 with the bevel gear 128. Assuming a clockwise rotation of bevel 116 as viewed from above, this causes rotation of the shaft 125 and rotation of bevel 123 also in a clockwise direction and with the ordinary right hand thread on the worm drive 121 will cause the shaft 118 to move toward the left also, drawing the cam 110 toward the left to put the follower on the right hand end of the latter. This movement toward the left of the shaft 118 immediately restores the vertical position of lever 137 and thereby releases the clutch member 126 so that the cam 110 will then remain in its new position.

Of course, when the engine speed drops and the governor balls approach each other, the reverse action will take place and the cam will then be moved toward the right so as to bring the follower to a new position thereon corresponding with the new engine speed.

In either form of device or in other forms which may possibly be designed the interposition of a servomotor between the speed sensitive device, such as the governor, and the cam shaft is important. Such speed sensitive devices do not have sufficient power to provide efficient operation of the shaft and are too sensitive to speed fluctuations. By using a servomotor having a balancing function such as described, small fluctuations of the speed sensitive device may be ignored and the cam position not subjected to frequent small changes.

Now having described the invention and the preferred forms of embodiment thereof, it is to be understood that the said invention is to be limited, not to the specific details herein described and illustrated, but only by the scope of the claim which follows:

I claim:

In an internal combustion engine having cam operated valves, variable cams for operating said valves, means for moving said cams to vary the action of said valves, said moving means comprising a speed sensitive device, and a servo-motor controlled thereby to move said cams to a position corresponding to engine speed and maintain them against slight fluctuations in engine speed.

HECTOR RABEZZANA.